(12) United States Patent
Pflug et al.

(10) Patent No.: US 11,305,690 B2
(45) Date of Patent: *Apr. 19, 2022

(54) VEHICULAR ADAPTIVE LIGHTING CONTROL SYSTEM

(71) Applicant: MAGNA ELECTRONICS INC., Auburn Hills, MI (US)

(72) Inventors: Goerg Pflug, Weil der Stadt (DE); Achim Gieseke, Gross-Umstadt (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/248,632

(22) Filed: Feb. 1, 2021

(65) Prior Publication Data

US 2021/0155156 A1    May 27, 2021

Related U.S. Application Data

(63) Continuation of application No. 15/420,240, filed on Jan. 31, 2017, now Pat. No. 10,906,463.
(Continued)

(51) Int. Cl.
*B60Q 3/80* (2017.01)
*G09G 3/34* (2006.01)
(Continued)

(52) U.S. Cl.
CPC .............. *B60Q 3/80* (2017.02); *B60Q 1/1407* (2013.01); *B60Q 3/18* (2017.02); *G06V 20/597* (2022.01);
(Continued)

(58) Field of Classification Search
CPC .......... B60Q 3/80; B60Q 1/1407; B60Q 3/18; B60Q 2300/054; B60Q 2300/305;
(Continued)

(56) References Cited

U.S. PATENT DOCUMENTS 5,172,785 A    12/1992  Takahashi
5,550,677 A     8/1996  Schofield et al.
(Continued)

FOREIGN PATENT DOCUMENTS

WO    2010144900 A1    12/2010

OTHER PUBLICATIONS

Chang et al., "Evening use of light-emitting eReaders negatively affects sleep, circadian timing, and next-morning alertness," CrossMark PNAS, Jan. 27, 2015, pp. 1232-1237.

*Primary Examiner* — David D Davis
(74) *Attorney, Agent, or Firm* — Honigman LLP

(57) ABSTRACT

A vehicular lighting control system includes a controller configured to be disposed at a vehicle and operable to control interior lighting of the vehicle, with the interior lighting including (i) an interior light of the vehicle and/or (ii) a backlighting light of a display of the vehicle. The controller adjusts color of the interior lighting for different driving conditions. During daytime, the controller adjusts color of the interior lighting of the vehicle to follow a daytime color scheme. Responsive to a navigation input, the controller determines if an input destination has an estimated arrival time of the vehicle after daytime. Responsive to determination that the estimated arrival time of the vehicle is after daytime, the controller maintains the daytime color scheme for the interior lighting of the vehicle until the vehicle arrives at the input destination after daytime.

22 Claims, 9 Drawing Sheets

Related U.S. Application Data

(60) Provisional application No. 62/289,443, filed on Feb. 1, 2016.

(51) Int. Cl.

| | | |
|---|---|---|
| *B60Q 3/18* | (2017.01) | |
| *B60Q 1/14* | (2006.01) | |
| *H05B 45/20* | (2020.01) | |
| *H05B 47/11* | (2020.01) | |
| *G06V 20/59* | (2022.01) | |

(52) U.S. Cl.
CPC .......... *G09G 3/3413* (2013.01); *H05B 45/20* (2020.01); *H05B 47/11* (2020.01); *B60Q 2300/054* (2013.01); *B60Q 2300/305* (2013.01); *B60Q 2300/31* (2013.01); *G09G 2320/0666* (2013.01); *G09G 2354/00* (2013.01); *G09G 2360/144* (2013.01); *G09G 2380/10* (2013.01); *G09G 2380/14* (2013.01); *Y02B 20/40* (2013.01)

(58) Field of Classification Search
CPC ............. B60Q 2300/31; G06V 20/597; G09G 3/3413; G09G 2320/0666; G09G 2354/00; G09G 2360/144; G09G 2380/10; G09G 2380/14; H05B 45/20; H05B 47/11; Y02B 20/40
See application file for complete search history.

(56) References Cited

U.S. PATENT DOCUMENTS

| | | | |
|---|---|---|---|
| 5,670,935 | A | 9/1997 | Schofield et al. |
| 5,760,962 | A | 6/1998 | Schofield et al. |
| 5,786,772 | A | 7/1998 | Schofield et al. |
| 5,796,094 | A | 8/1998 | Schofield et al. |
| 5,877,897 | A | 3/1999 | Schofield et al. |
| 5,929,786 | A | 7/1999 | Schofield et al. |
| 5,949,331 | A | 9/1999 | Schofield et al. |
| 6,201,642 | B1 | 3/2001 | Bos |
| 6,302,545 | B1 | 10/2001 | Schofield et al. |
| 6,396,397 | B1 | 5/2002 | Bos et al. |
| 6,498,620 | B2 | 12/2002 | Schofield et al. |
| 6,523,964 | B2 | 2/2003 | Schofield et al. |
| 6,536,928 | B1 | 3/2003 | Hein et al. |
| 6,587,573 | B1 | 7/2003 | Stam et al. |
| 6,611,202 | B2 | 8/2003 | Schofield et al. |
| 6,690,268 | B2 | 2/2004 | Schofield et al. |
| 6,717,610 | B1 | 4/2004 | Bos et al. |
| 6,757,109 | B2 | 6/2004 | Bos |
| 6,802,617 | B2 | 10/2004 | Schofield et al. |
| 6,806,452 | B2 | 10/2004 | Bos et al. |
| 6,822,563 | B2 | 11/2004 | Bos et al. |
| 6,882,287 | B2 | 4/2005 | Schofield |
| 6,891,563 | B2 | 5/2005 | Schofield et al. |
| 6,946,978 | B2 | 9/2005 | Schofield |
| 7,005,974 | B2 | 2/2006 | McMahon et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 7,859,565 | B2 | 12/2010 | Schofield et al. |
| 7,881,496 | B2 | 2/2011 | Camilleri et al. |
| 8,427,751 | B2 | 4/2013 | Rumpf et al. |
| 8,694,224 | B2 | 4/2014 | Chundrlik, Jr. et al. |
| 9,041,806 | B2 | 5/2015 | Baur et al. |
| 9,126,525 | B2 | 9/2015 | Lynam et al. |
| 9,210,761 | B2 | 12/2015 | Nackaerts et al. |
| 9,357,208 | B2 | 5/2016 | Gupta et al. |
| 9,596,387 | B2 | 3/2017 | Achenbach et al. |
| 9,762,880 | B2 | 9/2017 | Pflug |
| 9,900,522 | B2 | 2/2018 | Lu |
| 10,906,463 | B2 * | 2/2021 | Pflug ..................... H05B 47/11 |
| 2007/0282522 | A1 | 12/2007 | Geelen |
| 2008/0065291 | A1 | 3/2008 | Breed |
| 2009/0010494 | A1 | 1/2009 | Bechtel et al. |
| 2009/0273563 | A1 | 11/2009 | Pryor |
| 2009/0292528 | A1 | 11/2009 | Kameyama |
| 2010/0045797 | A1 | 2/2010 | Schofield et al. |
| 2011/0084852 | A1 | 4/2011 | Szczerba |
| 2011/0090149 | A1 | 4/2011 | Larsen et al. |
| 2011/0178670 | A1 | 7/2011 | Perkins et al. |
| 2011/0241545 | A1 | 10/2011 | Miller et al. |
| 2012/0033123 | A1 | 2/2012 | Inoue et al. |
| 2012/0116632 | A1 | 5/2012 | Bechtel et al. |
| 2012/0162427 | A1 | 6/2012 | Lynam |
| 2012/0209358 | A1 | 8/2012 | Feng |
| 2013/0116859 | A1 | 5/2013 | Ihlenburg et al. |
| 2013/0286193 | A1 | 10/2013 | Pflug |
| 2014/0036080 | A1 | 2/2014 | Schut et al. |
| 2014/0049973 | A1 | 2/2014 | Adachi et al. |
| 2014/0139676 | A1 | 5/2014 | Wierich |
| 2014/0152778 | A1 | 6/2014 | Ihlenburg et al. |
| 2014/0152792 | A1 | 6/2014 | Krueger |
| 2014/0226303 | A1 | 8/2014 | Pasdar |
| 2014/0333729 | A1 | 11/2014 | Pflug |
| 2014/0340510 | A1 | 11/2014 | Ihlenburg et al. |
| 2015/0022664 | A1 | 1/2015 | Pflug et al. |
| 2015/0035437 | A1 | 2/2015 | Panopoulos et al. |
| 2015/0092042 | A1 | 4/2015 | Fursich |
| 2015/0174361 | A1 | 6/2015 | Baaijens et al. |
| 2015/0232030 | A1 | 8/2015 | Bongwald |
| 2015/0343945 | A1 | 12/2015 | Salter et al. |
| 2015/0344028 | A1 | 12/2015 | Gieseke et al. |
| 2016/0104486 | A1 | 4/2016 | Penilla et al. |
| 2016/0188987 | A1 | 6/2016 | Lisseman et al. |
| 2016/0209647 | A1 | 7/2016 | Fursich |
| 2016/0267335 | A1 | 9/2016 | Hampiholi |

\* cited by examiner

VEHICULAR ADAPTIVE LIGHTING CONTROL SYSTEM

CROSS REFERENCE TO RELATED APPLICATIONS

The present application is a continuation of U.S. patent application Ser. No. 15/420,240, filed Jan. 31, 2017, now U.S. Pat. No. 10,906,463, which claims the filing benefits of U.S. provisional application Ser. No. 62/289,443, filed Feb. 1, 2016, which is hereby incorporated herein by reference in its entirety.

FIELD OF THE INVENTION

The present invention relates generally to a vehicle vision system for a vehicle and, more particularly, to a vehicle vision system that controls one or more lights at a vehicle.

BACKGROUND OF THE INVENTION

In the 1930s, Enteramine, and in the 1940s, Serotonin, were discovered as hormones in the human body. Later, these were acknowledged to be responsible or at least involved in some body functions as a neuro transmitter. With Melatonin and Cortisol, two hormones were found as counteracting in the human circadian clock (see FIG. 2), together with Serotonin. The Melatonin is the hormone which controls awareness or awakedness and/or sleepiness, Cortisol is a stress hormone and Serotonin is influencing our mood (or happiness) and motivation. The human circadian clock cycle is per se endogen (according Jürgen Aschoff's experiments in the 1960s), but differs from person to person, so from about 24 hours to about 33 hours. It was found the (endogen) human circadian clock just gets calibrated to the natural 24 hour day and night cycle, by the light perceived by the human eyes.

In 2001, a new eye photoreceptor was found, the intrinsically photoreceptive Retinal Ganglion Cells (ipRGCs), which makes about two percent of a human eye's Ganglion cells (beside the rods and cones), was found to be the responsible receptor for the circadian clock conception. Both the light intensity as well as the light color were found to have influence to a human's hormone release (FIG. 3). For example, night time light exposure to greater than 10 lx can already limit the nighttime Melatonin release, such as shown in FIG. 4. Workers in offices with daytime correlated office lighting at which the color temperature was tuned in between about 6,500 K at mid-day and about 3,000 K in the mornings and evenings paired with a light intensity in between about 1,400 lx at mid-day and about 600 lx in the mornings and evenings, which was more indirect in the intense phase (FIG. 5), were found to have better health parameters such as heart rate variability, felt better subjectively, were more concentrated and had better sleeping quality (eventually one effecting the other).

A similar correlation was found to users of self-illuminated e-reader devices, which were found to negatively affect sleep and circadian timing and next morning alertness. Companies such as f.lux came up with a similar approach for hand held devices and desktop monitors, which have in common that all have self-illuminated displays. The f.lux software tunes the light color to warmer temperatures at evening, overnight and morning, while tuning the light color to colder temperatures over the day in a sinusoidal-like time scheme irrespective of the surrounding light (see FIG. 6).

SUMMARY OF THE INVENTION

The present invention provides a driver assistance system or light control system for a vehicle that utilizes a control and one or more lights of the vehicle (such as interior lights of the vehicle) and controls the lights to provide a desired or selected color based on at least one of (i) a driver attentiveness input and (ii) a driver age input, and optionally a time of day input, an ambient light input, a weather condition input, and/or a navigation input. For example, the system and control may adjust the color of the vehicle interior lights (and/or a display such as backlighting color of a display to change the overall color scheme of the display) to accommodate a change in ambient light at the vehicle or time of day of driving of the vehicle or an estimated arrival time for an input destination of a navigation system of the vehicle or the like. The system thus provides a desired or appropriate color scheme of the interior lights and/or display (and optionally the headlights of the vehicle as well) to enhance the attentiveness or comfort of the driver while the driver is driving the vehicle.

These and other objects, advantages, purposes and features of the present invention will become apparent upon review of the following specification in conjunction with the drawings.

DESCRIPTION OF THE PREFERRED EMBODIMENTS

Figure 1:
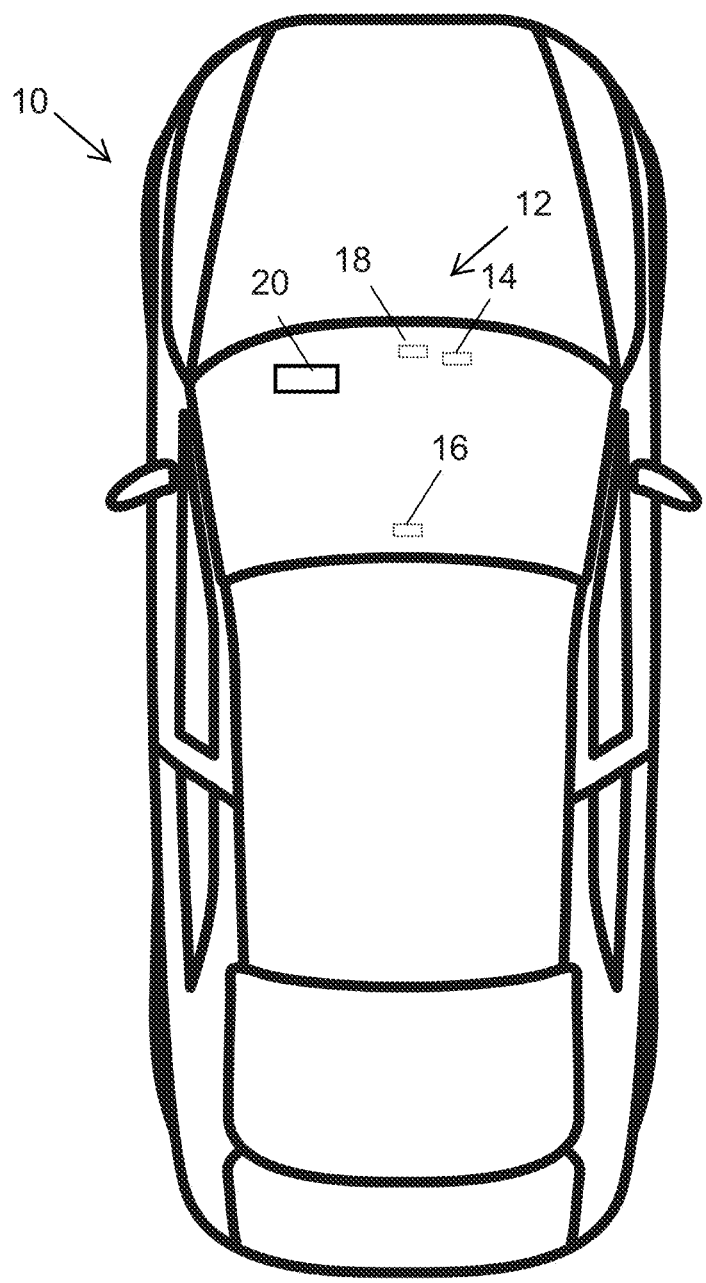
FIG. 1 is a plan view of a vehicle with a control system that incorporates lights and a control in accordance with the present invention.
Figure 2:
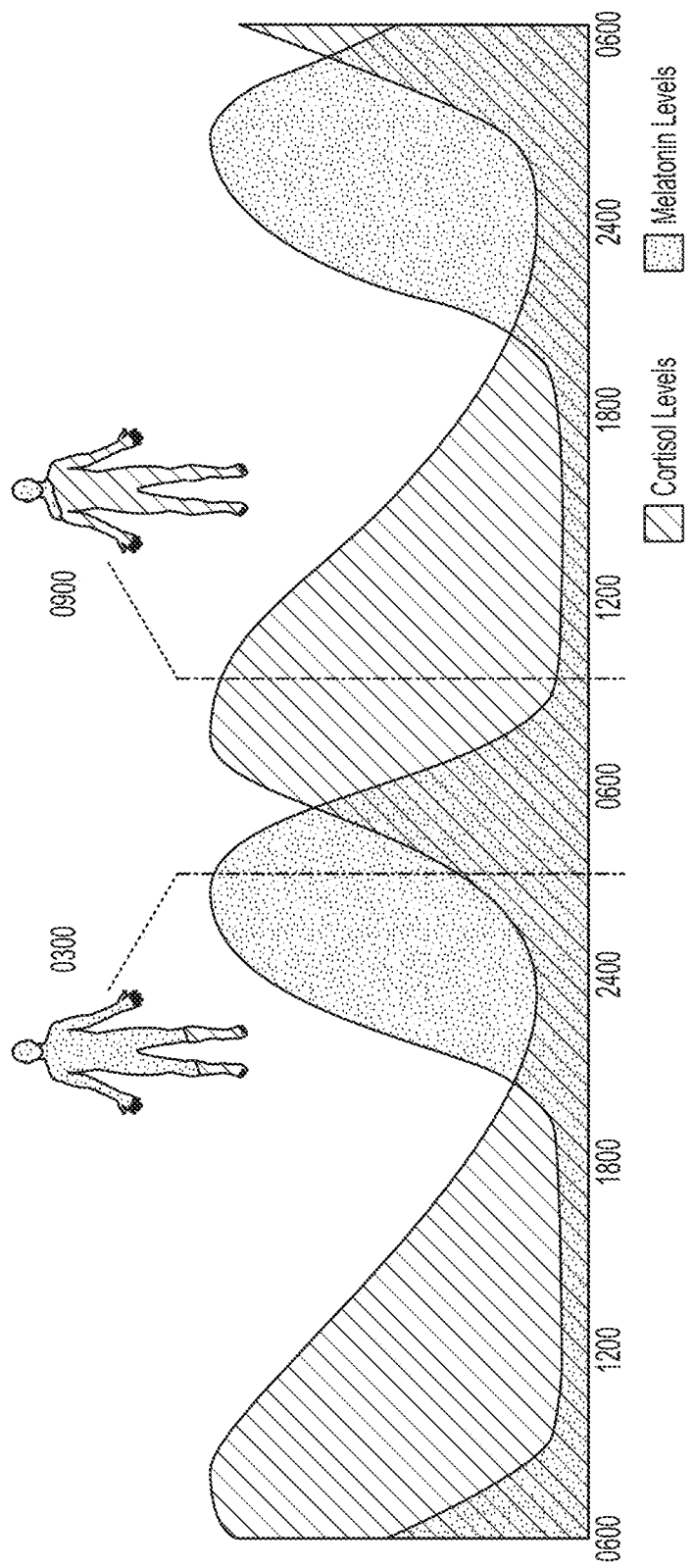
FIG. 2 is a graph showing the influence of daylight on the Cortisol and Melatonin levels in a human body.
Figure 3:
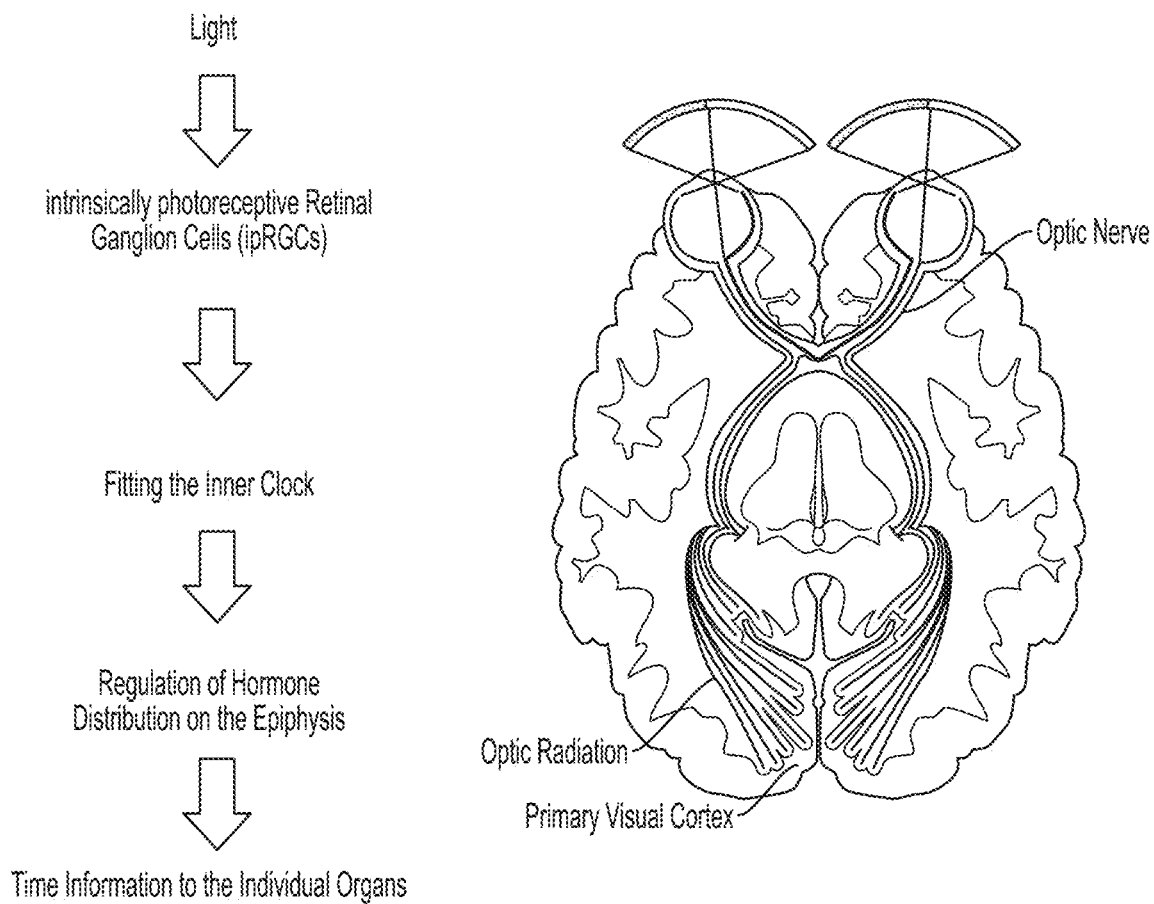
FIG. 3 shows the effect of light on an internal "clock" of a human body.
Figure 4:
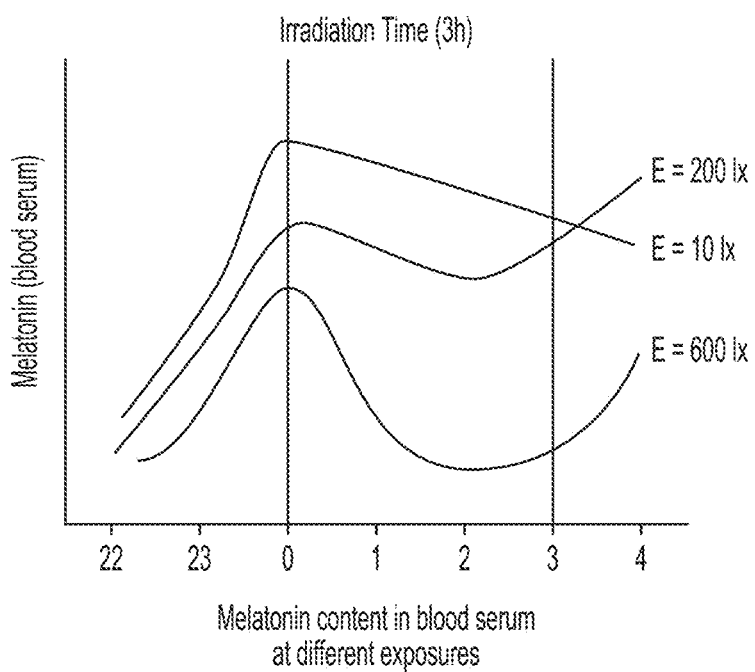
FIG. 4 is a graph showing the Melatonin levels of a human responsive to irradiation time.
Figure 5:
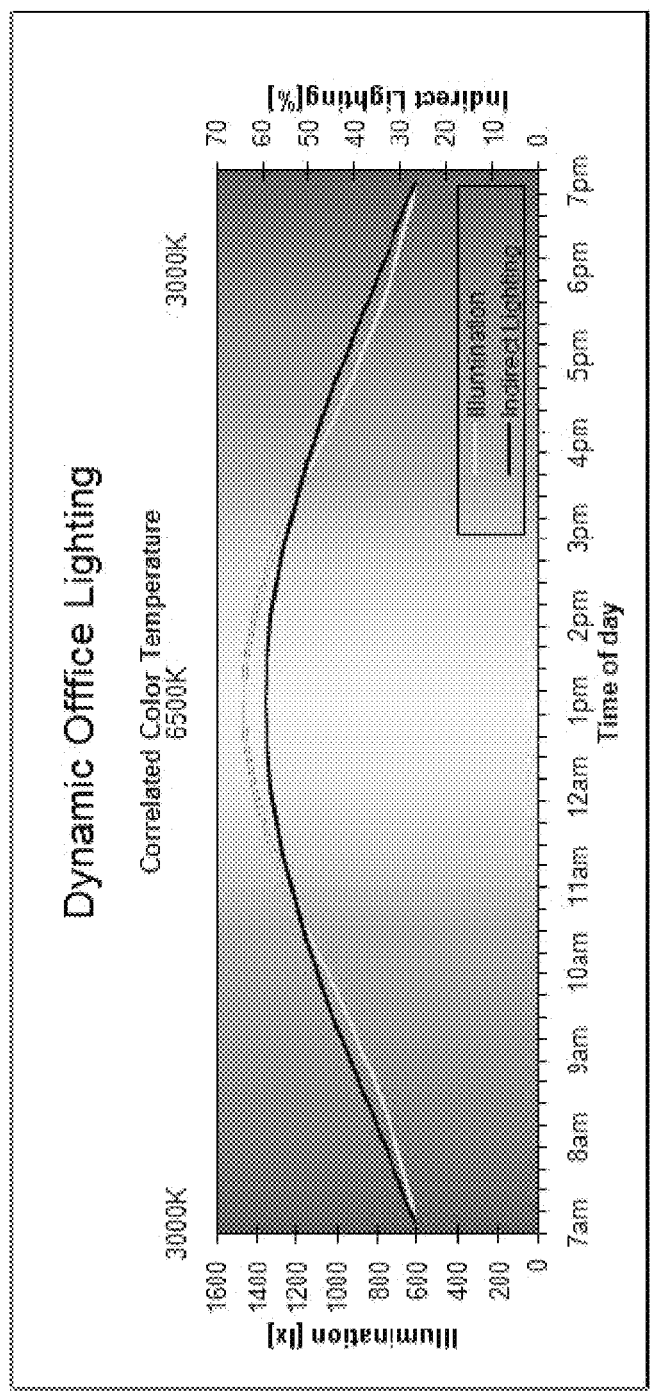
FIG. 5 is a graph showing an example of a dynamic office lighting system.
Figure 6:
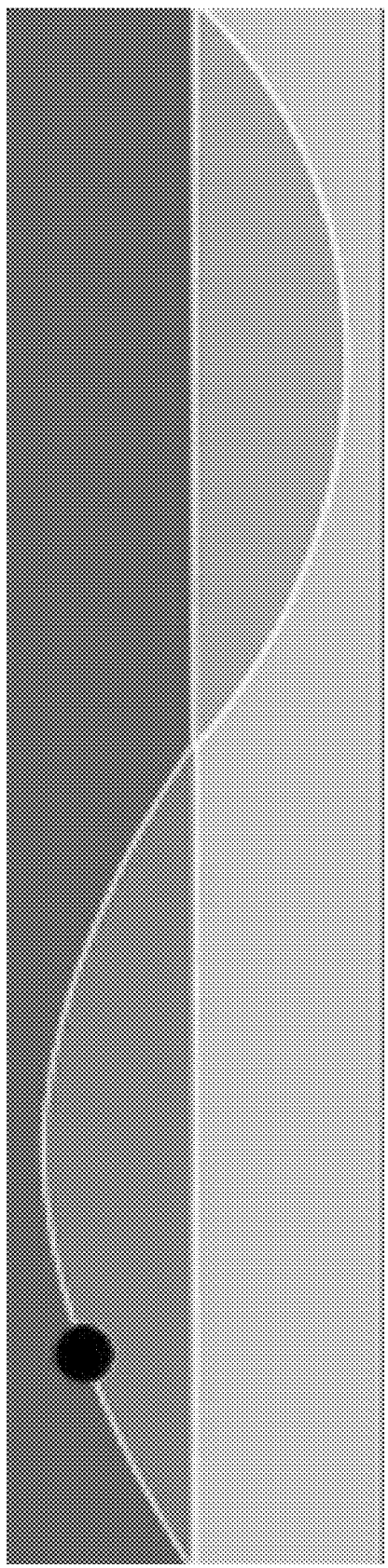
FIG. 6 is a graph showing a change of lighting in a sinusoidal-like time scheme irrespective of the surrounding light.

Referring now to the drawings and the illustrative embodiments depicted therein, a vehicle 10 includes a lighting system 12 that includes a controller or control 14 for controlling at least one light 16 of the vehicle (with the light 16 comprising an interior light or lights of the vehicle and optionally the system may include one or more exterior lights of the vehicle). Optionally, a cabin monitor or driver monitor sensor 18 (such as one or more interior viewing cameras or the like) may be provided to capture image data representative of the driver's head and face and eyes, whereby the control may adjust the light 16 responsive to image processing of captured image data. The control 14 may also control a display 20 (such as a display screen or a head up display or the like) that displays information or images for viewing by the driver of the vehicle. The data transfer or signal communication from the sensor to the control or from the control to the display or lights may comprise any suitable data or communication link, such as a vehicle network bus or the like of the equipped vehicle.

Automotive displays, wearables and head up displays are nowadays color temperature fine tunable as well as the ambient vehicle interior lighting. Vehicle head lights are typically not tunable in color, with the color of the headlights depending on the light source which is installed, such as Xenon lights, which are hotter and by that brighter and have more blue (so called 'colder' light) components compared to a conventional light bulb glowing less hot having more red components (so called 'warmer' light).

Figure 7:
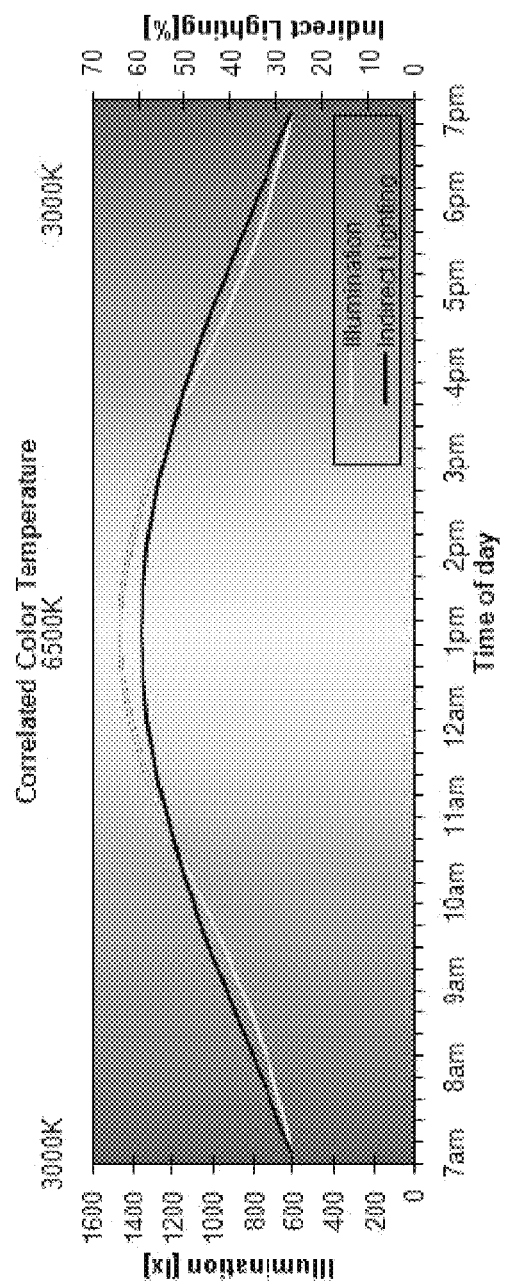
FIG. 7 is a graph showing a dynamic vehicle lighting system's change in lighting color responsive to a time of day in accordance with the present invention.

The present invention provides a lighting control system for supporting the vehicle driver's circadian timing, with the control controlling the vehicle's instrument backlights and displays, wearables and head up displays to tune them in intensity and light color in accordance with the current local time, such as by tuning to a less bright and to a color temperature around 3,000 K the later it is in the evening or earlier in the morning and by tuning to a color temperature up to 6,500 K and brighter around noon (see FIG. 7).

Optionally, the interior light sources of the vehicle may also be tuned in intensity and light color in accordance with the current local time. Optionally, the amount of indirect light within the vehicle cabin may also be tuned in intensity and light color in accordance with the current local time. Optionally, the display and ambient light tuning may be tuned to more warmer light tones on days at which the light outside of the vehicle are colder, such as on rainy days or the like, for making the driver feel more cozy or comfortable, and may tune the lights to a more bluish color on bright sunshine days. Optionally, the control may control the display of the vehicle to more colder light tones on days at which the light outside of the vehicle is colder (the opposite of the previous option), such as on rainy days or the like, and may tune the display to more reddish colors on bright sunshine days for making displayed colors or white look more authentic (subjectively).

Optionally, color tunable vehicle head lights may come into use, such as LEDs that can be made as RGB LEDs similar to household illumination LEDs, tunable in light color and dimmable in light intensity. In most practical cases, the light intensity may not be tunable for the driver's comfort reason but for adapting the high beam and providing spot lighting. In those cases, just the light color may be tuned in accordance with the current local time.

Alternatively to the time scheme above, the vehicle user may have the option to tune the time scheme individually. This may be beneficial to a shift worker. For example, such a shift worker may have to get up to work late, sleeping at day time, and by that he or she may prefer to have colder colors at the vehicle displays and optionally also at the ambient lighting and head lights when driving to work in the evening and more warm lights when driving home in the early morning. Another example may be a user flying in from another time zone, preferring to keep in his or her time scheme, such as flight attendants do, instead of adapting to the local time.

Alternatively to the time scheme above, the vehicle may have a driver drowsiness assistant. Since warmer colors support the driver's relaxation and sleepiness, warm colors may be counterproductive to drivers who want to stay awake. A vehicle may generally follow a daytime according time scheme, but may stretch the bright light and cold light color time interval in situations where the driver has planned a road trip extending into night time (and the system may provide such adjustment of the time scheme responsive to a navigation system of the vehicle where the driver has input a route or destination that requires driving into nighttime).

Figure 8:
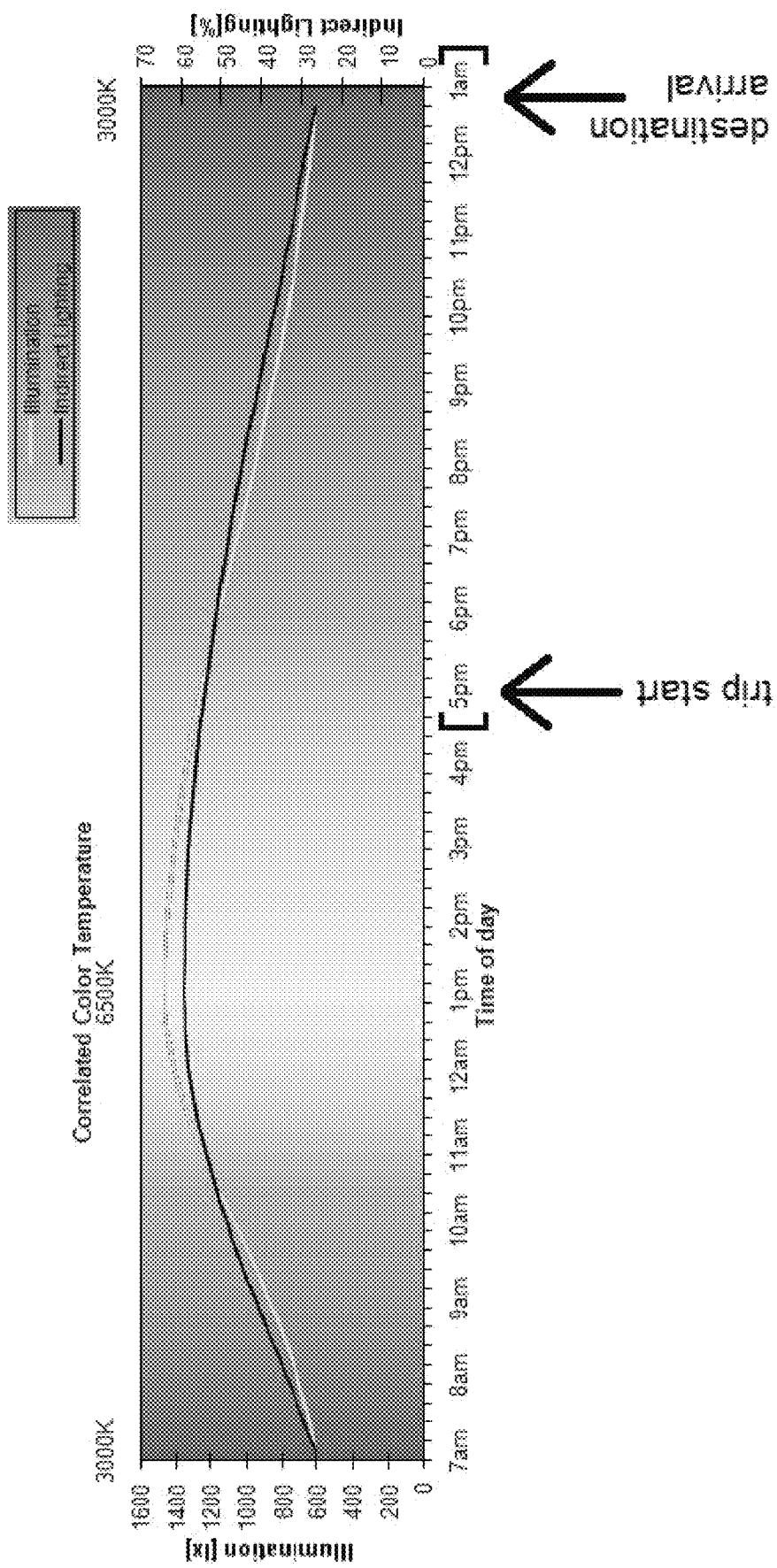
FIG. 8 is a graph showing a dynamic vehicle lighting system's change in lighting color responsive to a navigation input in accordance with the present invention.

Optionally, sophisticated systems may have a bot on a cell phone or cloud, which mainly may be based on a user's calendar and optionally/additionally based on artificial intelligence (AI), for detecting the driver's long term habits and short term duties. The system may use such a bot for analyzing and predicting whether a vehicle ride may last into earlier or later night time so that the system can tune or adjust the drowsiness assistant's parameter(s) accordingly. Optionally, the drowsiness assistant may employ drowsiness sensors, such as eye lid detection. By these, the drowsiness assistant system may detect close to sleep or short sleep events upon which the driver gets warned that he or she is drowsy. Optionally, the drowsiness assistant artificial intelligence system may employ a (long duration) reinforcement feedback learning process of any kind, which may learn the typical tripping of the driver becoming drowsy when driving long and or at evening or night time. The drowsiness assistant may learn to tune the extended bright light and cold light color time interval in a way that the driver is (expected or predicted) typically just arriving to the trip goal (according the vehicle's or remotely attached navigation device or smart phone with navigation application or personal calendar bot or drowsiness assistant AI), so that the driver's past trip sleep is least as possible affected, but he or she does not need to break the trip due to sleepiness (see FIG. 8).

Figure 9:
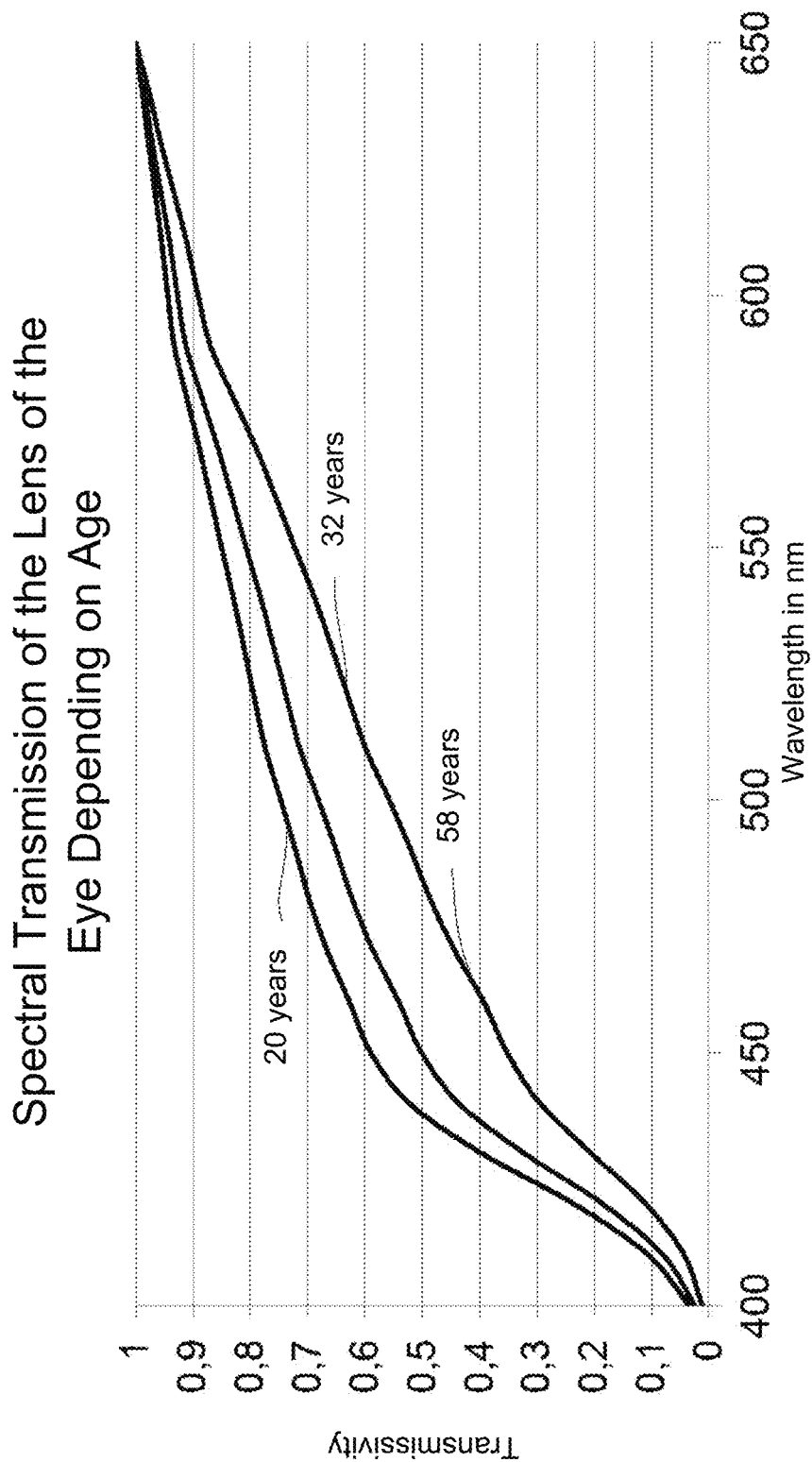
FIG. 9 is a graph showing a change in spectral transmission of the lens of a person's eyes depending on the age of the person.

Optionally, and such as for any or all of the solutions above, the vehicle's light scheme may be adapted to the driver's age, since with aging, the shorter wave lengths transmittance of the human eye diminishes stronger than the transmittance of longer wave lengths (see FIG. 9). By that the color scheme (of the interior lights and/or display lighting and/or headlights) may be tuned to shorter wave lengths for an aging driver to cope with or accommodate the age influence of light transmittance (where the age of the driver may be input into the system and the system or control may adjust the lighting accordingly).

As another aspect of the invention concerning head up displays, since the head up display's display content is augmented or overlayed to a real image (from behind the HUD's combiner or windshield according the HUD type), the displayed content may be too bright or too dim (or less bright) in contrast to the real background scene. Knowing the driver's eye positions, such as by using an eye tracker for tracking the driver's eyes, the position of the virtual HUD image and the scene in front of the vehicle by using a forwardly viewing vehicle camera, the system can determine how bright and which color and what texture the background of a HUD image in the line of sight from the driver's eyes has. The system may adapt the display content's brightness and optionally also the color on individually positions of on the HUD displayed content to enhance the contrast and the evenness, and to cope with cluttering due to individual background brightness and color.

Thus, the system of the present invention provides for automatic adjustment of the color and intensity of a light of a vehicle (such as an interior cabin light and/or display backlight and/or the like) responsive to one or more inputs associated with the driver and/or the driving conditions and/or the like. The system, responsive to an input indicative of the driver's age and/or attentiveness, automatically adjusts the color and/or intensity of the vehicle lights to provide enhanced lighting for that particular driver at that time. The system may also or otherwise automatically adjust the vehicle lighting responsive to other inputs associated with the time of day or ambient lighting or weather, in order to provide enhanced lighting for the driver during the particular current driving conditions. The system may also or otherwise automatically adjust the vehicle lighting responsive to navigation input indicative of a planned trip such that the vehicle lighting provides appropriate lighting for the driver during the driving event. The system may also or otherwise automatically adjust the vehicle lighting responsive to a user input that allows the user or driver of the vehicle to select a color scheme or color change so that the system automatically adjusts the vehicle lighting at desired or selected times or during desired or selected events and/or the like.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The display 20 is operable to display information and/or video images for viewing by the driver of the vehicle, with the control adjusting the backlighting of the display or the color of the display according to the time of day, age of the driver, weather conditions, navigation input, and/or the like. The display may utilize aspects of the display systems described in U.S. Pat. No. 8,427,751 and/or U.S. Publication Nos. US-2014-0333729; US-2014-0139676; US-2015-0092042; US-2015-0232030 and/or US-2016-0209647, which are all hereby incorporated herein by reference in their entireties. Optionally, the system (utilizing a forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Optionally, for example, the system and/or processing and/or camera and/or circuitry may utilize aspects described in U.S. Pat. Nos. 8,694,224; 7,005,974; 5,760,962; 5,877,897; 5,796,094; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661; WO 2013/158592 and/or WO 2014/204794, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular lighting control system, said vehicular lighting control system comprising:
  a controller configured to be disposed at a vehicle equipped with said vehicular lighting control system, said controller operable to control interior lighting of the vehicle, wherein the interior lighting comprises at least one selected from the group consisting of (i) an interior light of the vehicle and (ii) a backlighting light of a display of the vehicle;
  wherein, with said controller disposed at the vehicle, said controller adjusts a color of the interior lighting of the vehicle for different driving conditions;
  wherein, with said controller disposed at the vehicle, and during daytime, said controller adjusts color of the interior lighting of the vehicle to follow a daytime color scheme;
  wherein, responsive to a navigation input, said controller determines if an input destination has an estimated arrival time of the vehicle after daytime; and
  wherein, responsive to determination that the estimated arrival time of the vehicle is after daytime, said controller maintains the daytime color scheme for the interior lighting of the vehicle until the vehicle arrives at the input destination after daytime.

2. The vehicular lighting control system of claim 1, wherein the interior lighting comprises an interior light of the vehicle.

3. The vehicular lighting control system of claim 1, wherein the interior lighting comprises a backlighting light of a display of the vehicle.

4. The vehicular lighting control system of claim 1, wherein said controller adjusts color of the interior lighting of the vehicle to follow the daytime color scheme based on a current local time of day where the vehicle is located.

5. The vehicular lighting control system of claim 1, wherein said controller adjusts color of the interior lighting of the vehicle to follow the daytime color scheme based on an ambient light level at the vehicle.

6. The vehicular lighting control system of claim 1, wherein said controller adjusts color of the interior lighting of the vehicle to provide different color of light during high ambient lighting conditions as compared to color of light provided during lower ambient lighting conditions.

7. The vehicular lighting control system of claim 6, wherein, responsive to determination that the estimated arrival time of the vehicle is after daytime, said controller maintains the daytime color scheme for the interior lighting of the vehicle irrespective of lower ambient lighting conditions after daytime.

8. The vehicular lighting control system of claim 1, wherein said controller adjusts color of the interior lighting of the vehicle to provide different color of light during rainy conditions as compared to color of light provided during sunny conditions.

9. The vehicular lighting control system of claim 1, wherein said controller adjusts color of the interior lighting of the vehicle to provide different color of light responsive to a determination that the driver is drowsy or inattentive as compared to color of light provided responsive to a determination that the driver is awake or attentive.

10. The vehicular lighting control system of claim 1, wherein said controller adjusts color of the interior lighting of the vehicle to provide different color of light responsive to an age input pertaining to the age of the driver of the vehicle.

11. The vehicular lighting control system of claim 1, wherein said controller adjusts color of the interior lighting of the vehicle to provide different color of light during daytime as compared to color of light provided during morning, evening and nighttime.

12. The vehicular lighting control system of claim 1, wherein said controller adjusts color of the interior lighting of the vehicle at least in part responsive to a user input so a user can select a lighting schedule, and wherein said controller adjusts color of the interior lighting in accordance with a user selected lighting schedule.

13. A vehicular lighting control system, said vehicular lighting control system comprising:
- a controller configured to be disposed at a vehicle equipped with said vehicular lighting control system, said controller operable to control interior lighting of the vehicle, wherein the interior lighting comprises at least one interior light of the vehicle;
- wherein, with said controller disposed at the vehicle, said controller adjusts a color of the interior lighting of the vehicle for different driving conditions;
- wherein said controller adjusts color of the interior lighting of the vehicle to provide different color of light during higher ambient lighting conditions as compared to color of light provided during lower ambient lighting conditions;
- wherein, with said controller disposed at the vehicle, and during daytime, said controller adjusts color of the interior lighting of the vehicle to follow a daytime color scheme;
- wherein said controller adjusts color of the interior lighting of the vehicle to follow the daytime color scheme based at least in part on an ambient light level at the vehicle;
- wherein, responsive to a navigation input, said controller determines if an input destination has an estimated arrival time of the vehicle after daytime; and
- wherein, responsive to determination that the estimated arrival time of the vehicle is after daytime, said controller maintains the daytime color scheme for the interior lighting of the vehicle until the vehicle arrives at the input destination after daytime.

14. The vehicular lighting control system of claim 13, wherein the interior lighting further comprises a backlighting light of a display of the vehicle.

15. The vehicular lighting control system of claim 13, wherein said controller adjusts color of the interior lighting of the vehicle to follow the daytime color scheme based in part on a current local time of day where the vehicle is located.

16. The vehicular lighting control system of claim 13, wherein, responsive to determination that the estimated arrival time of the vehicle is after daytime, said controller maintains the daytime color scheme for the interior lighting of the vehicle irrespective of lower ambient lighting conditions after daytime.

17. The vehicular lighting control system of claim 13, wherein said controller adjusts color of the interior lighting of the vehicle to provide different color of light during rainy conditions as compared to color of light provided during sunny conditions.

18. A vehicular lighting control system, said vehicular lighting control system comprising:
- a controller configured to be disposed at a vehicle equipped with said vehicular lighting control system, said controller operable to control interior lighting of the vehicle, wherein the interior lighting comprises at least one selected from the group consisting of (i) an interior light of the vehicle and (ii) a backlighting light of a display of the vehicle;
- wherein, with said controller disposed at the vehicle, said controller adjusts a color of the interior lighting of the vehicle for different driving conditions;
- wherein said controller adjusts color of the interior lighting of the vehicle responsive to an ambient light level at the vehicle;
- wherein, with said controller disposed at the vehicle, and during daytime, said controller adjusts color of the interior lighting of the vehicle to follow a daytime color scheme;
- wherein said controller adjusts color of the interior lighting of the vehicle to follow the daytime color scheme based at least in part on the ambient light level at the vehicle being greater than a threshold level; wherein, responsive to a navigation input, said controller determines if an input destination has an estimated arrival time of the vehicle after daytime; and
- wherein, responsive to determination that the estimated arrival time of the vehicle is after daytime, said controller maintains the daytime color scheme for the interior lighting of the vehicle until the vehicle arrives at the input destination after daytime.

19. The vehicular lighting control system of claim 18, wherein the interior lighting comprises an interior light of the vehicle.

20. The vehicular lighting control system of claim 18, wherein the interior lighting comprises a backlighting light of a display of the vehicle.

21. The vehicular lighting control system of claim 18, wherein, responsive to determination that the estimated arrival time of the vehicle is after daytime, said controller maintains the daytime color scheme for the interior lighting of the vehicle irrespective of lower ambient lighting conditions below the threshold level.

22. The vehicular lighting control system of claim 18, wherein said controller adjusts color of the interior lighting of the vehicle to provide different color of light during rainy conditions as compared to color of light provided during sunny conditions.

* * * * *